UNITED STATES PATENT OFFICE.

CLARENCE V. ELLIOTT, OF SCHENECTADY, NEW YORK, ASSIGNOR TO GENERAL ELECTRIC COMPANY, A CORPORATION OF NEW YORK.

ARC-WELDING ELECTRODE.

1,294,250. Specification of Letters Patent. Patented Feb. 11, 1919.

No Drawing. Application filed July 22, 1918. Serial No. 245,975.

*To all whom it may concern:*

Be it known that I, CLARENCE V. ELLIOTT, a citizen of the United States, residing at Schenectady, in the county of Schenectady, State of New York, have invented certain new and useful Improvements in Arc-Welding Electrodes, of which the following is a specification.

The present invention relates to electric arc welding of metal bodies, and particularly to welding carried out by using a rod or pencil of metal as one terminal of an arc and transferring particles of this welding electrode by means of the arc to the work to be welded.

Heretofore considerable trouble frequently has been experienced in carrying out arc welding with a metal electrode due to the erratic behavior of the arc and the difficulty attending the deposit of the welding metal. In some cases welding electrodes have been found to operate with a quiet arc and to deposit welding metal smoothly on the work and in other cases electrodes having apparently the identical composition have been found to operate with an irregular sputtering arc and the molten metal could not be deposited on the work.

I have discovered that a smooth, regular operation of the arc and even deposit of welding metal may be obtained by associating the welding metal with a small quantity of a material, such, for example, as an alkaline oxid which has a high electron emissivity when heated. This material preferably is applied as a coating of inappreciable thickness. As will be explained hereinafter with greater detail the welding electrode thus associated with an electron-emitting material is not to be confused with welding electrodes consisting of a core of welding metal and a relatively heavy coating or sheath of asbestos, or other fluxing material, which is intended to protect the weld-deposited metal, or to produce a crater-like cavity to act as a sort of crucible to contain molten welding metal at the tip of the electrode.

A welding electrode embodying my invention may consist of a small rod or pencil of soft iron, steel or iron alloy such as used in carrying out welding whereby welding metal is supplied from one of the electrodes to the work which constitutes the opposite electrode. The metallic composition of the electrode does not constitute a part of my invention.

The welding electrode is coated with a thin layer of electron-emitting material, such, for example, as a hydroxid, a fluorid, a chlorid, a carbonate, a silicate, a sulfate, or other compound or a mixture of compounds of alkaline metals, such, for example, as calcium, barium, strontium, magnesium, sodium, potassium, lithium, or the like. In some cases small quantities of other substances may be added, for example, the electrode may be coated with alumina or silica suspended in a solution of sodium or potassium silicate. I prefer to use a coating of calcium hydroxid. This coating may be applied by dipping the welding electrodes into a thin bath of milk of lime, that is, in a bath consisting of water containing an excess of calcium hydroxid, part of which therefore is in solution and part in suspension. After having been thus dipped the electrodes are dried by exposure to the air so that a thin layer of lime remains clinging to their surfaces. An electrode thus prepared is essentially still a "bare metal electrode" as distinguished from a "flux coated electrode," the coating in some cases not even being visible to the eye. Indeed, a flux-coated electrode from which the wrapping or coating of impregnated asbestos, or similar fluxing material, has been removed without actually cleaning the surface of the electrode by abrasion possesses the desirable properties of a welding electrode treated in accordance with my invention. A perfectly clean wire is not suitable for welding. In other words, the entire electrode falling within the scope of my invention has either on its surface a coating of inappreciable thickness or associated with it in some other way an earthy material containing an alkaline metal in such small quantities as not to be detectable on or in the weld-deposited metal on the work.

I have found that a quantity of lime, or other alkaline compound, associated with a welding electrode in a quantity so small as to constitute a mere trace with respect to the mass of the welding metal possesses the advantage of operating with a smooth flowing quiet arc and depositing a welding metal evenly into the weld without the disadvantages attendant upon the use of coated electrodes containing a relatively thick sheath of fluxing material. For example, there is no tendency to include melted flux within the weld-deposited metal.

In addition to producing a quiet arc with readily flowing metal, an electrode treated in accordance with my invention can be used with greater success in producing overhead welds requiring that the welding metal be deposited upon the work against gravity. Another advantage attendant upon the use of a welding electrode embodying my invention consists in the production of a better union between the weld-deposited metal and the work.

It would appear in the light of experience with welding electrodes made in accordance with my invention that bare metal electrodes which heretofore were found to be operable with a quiet arc had accidentally a coating of lime or similar material upon their surface as a residue from the drawing lubricant or other manufacturing step.

What I claim as new and desire to secure by Letters Patent of the United States, is:

1. A metal arc welding electrode having a coating of inappreciable thickness containing a compound having a high electron emissivity when heated.

2. An arc welding electrode consisting essentially of iron associated with a compound of an alkaline metal in such small proportion that said compound will be substantially all dissipated by a welding arc, and being capable of depositing metal substantially free from said compound.

3. A metal arc welding electrode having a surface coating of inappreciable thickness containing a compound of an alkaline metal.

4. A metal arc welding electrode having a surface coating of a compound of an alkaline earth metal, said coating being insufficient in quantity to appear in detectable masses on weld-deposited metal from said electrode.

5. An arc welding electrode consisting essentially of a ferrous metal and having a coating of inappreciable thickness containing in chemical combination an alkaline metal.

6. An arc welding electrode consisting of ferrous metal and having a coating of a calcium compound of inappreciable thickness.

In witness whereof, I have hereunto set my hand this 19th day of July, 1918.

CLARENCE V. ELLIOTT.